Jan. 9, 1968   R. E. HENRY ETAL   3,362,720
ANNULAR SEAL ASSEMBLY
Filed July 1, 1965

INVENTORS
Ralph E. Henry
John A. Marino
BY
Popp and Sommer
ATTORNEYS

United States Patent Office 3,362,720
Patented Jan. 9, 1968

3,362,720
ANNULAR SEAL ASSEMBLY
Ralph E. Henry, Rixford, Pa., and John A. Marino, Olean, N.Y., assignors to Dresser Industries, Inc., Dallas, Tex., a corporation of Delaware
Filed July 1, 1965, Ser. No. 468,798
8 Claims. (Cl. 277—176)

ABSTRACT OF THE DISCLOSURE

An assembly of cylindrical intake and discharge valve housings disposed within a bore in a cylinder head; including means for communicating certain portions of the clearance space between the valve housings and the bore with discharge pressure to reduce fatigue stresses in the valve housings, and seal means for isolating these areas of high pressure from other areas of considerably lower pressure. The several seal means each include an annular groove in the valve houisng including a deep portion and a shallow portion forming therebetween an annular radial shoulder. The end wall of the shallow portion is flat and is inclined laterally away from the shoulder and outward from the groove bottom. This wall is inclined at an angle of from 18° to 22° with respect to a transverse radial plane. A split wedge ring is arranged within the shallow groove portion, having an outer diameter corresponding to that of the bore and having a flat inclined wall surface for engagement with the inclined end wall of the shallow groove portion. A flat-sided backup ring has an outside diameter substantially the same as that of the wedge ring and is dimensioned to bear against the shoulder between the groove portions. An annular ring of deformable elastomeric material is dimensioned to be received within the deeper groove portion, engaging the bore surface and the base of the groove. The higher pressure acting on the side of the seal defined by the deeper groove portion urges the annular ring into engagement with the backup ring; and the backup ring, bearing axially on the wedge ring, urges the wedge ring against the inclined groove to expand with the bore under high pressures to maintain the seal at the peripheral surfaces of the wedge ring and bore.

This invention relates to an annular seal assembly for sealing the joint between two members having opposing peripheral surfaces.

The primary object of the present invention is to provide a seal assembly which will seal against a high fluid pressure such as about 100,000 pounds per square inch (p.s.i.).

Another important object is to provide such a seal assembly which will be long-lived in effectiveness even though subjected to cyclic changes in the fluid pressure it must confine and in the clearance between the opposing peripheral surfaces of the members between which the seal assembly is operatively interposed.

Other objects and advantages of the present invention will be apparent from the following detailed description of a preferred embodiment illustrated in the accompanying drawing in which.

While the seal asssembly of the present invention may be used in any application where suitable, it is shown as embodied in a high compression reciprocating piston type compressor.

Figure 1:
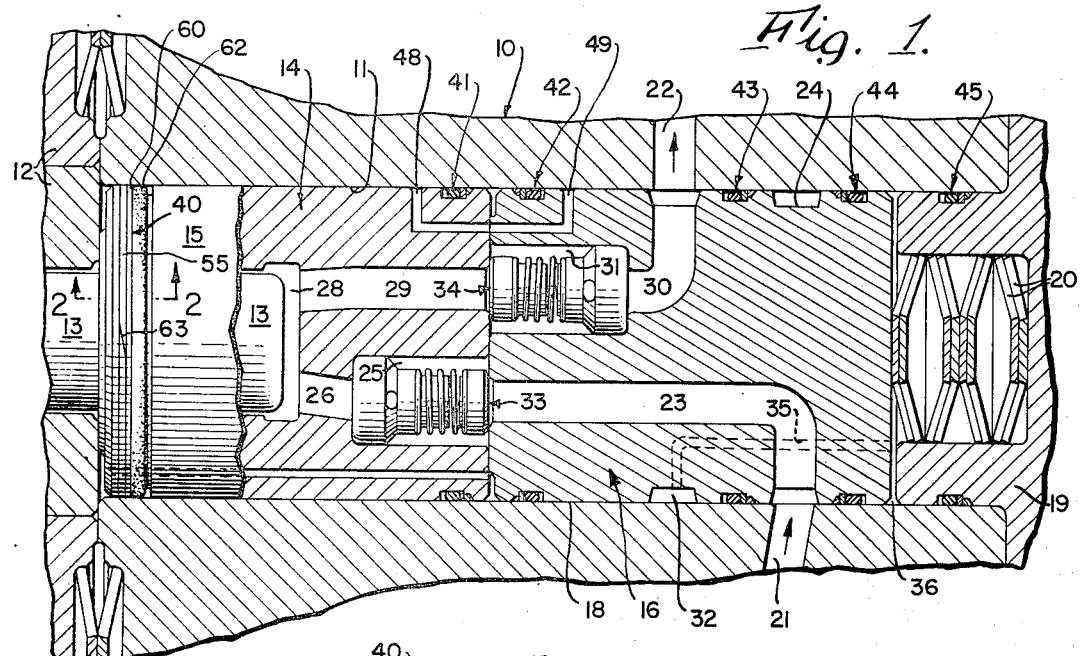
FIG. 1 is a central longitudinal section through the cylinder head of a high pressure reciprocating type compressor and showing several annular seal assemblies constructed in accordance with the principles of the present invention operatively arranged between suction and discharge valve bodies and the bore wall of the compressor cylinder head.

Referring to FIG. 1, the numeral 10 represents a cylinder head of such a compressor and is shown as having a cylindrical bore 11 extending completely therethrough. The inner or left end of this cylinder head is shown as engaging a tubular packing assembly 12 through which an elongated plunger 13 extends.

Arranged within bore 11 immediately adjacent and engaging packing assembly 12 is a suction valve body 14 having an external cylindrical peripheral surface 15. Also arranged within bore 11 immediately adjacent and engaging suction valve body 14 is a discharge valve body 16 having an external cylindrical peripheral surface 18. The abutting end faces of valve bodies 14 and 16 provide a controlled area ground joint.

The outer end of bore 11 is shown as plugged by a closure member 19. A series of double Belleville washers 20 are operatively interposed between closure member 19 and the outer or right end face of discharge valve body 16.

Cylinder head 10 is shown as having an inlet or suction port 21 and on its opposite side an outlet or discharge port 22. Outer body 16 is formed with an L-shaped passage 23 which communicates at one end with an annular groove 24 formed in the periphery 18 of this body, and at its opposite end with a chamber 25 formed in the outer end face of inner body 14. Groove 24 communicates with inlet port 21. A short passage 26 connects chamber 25 to a plunger end chamber 28 which also communicates with an outlet passage 29, all in inner valve body 14. Outer valve body 16 has an L-shaped passage 30 one end of which is enlarged to provide a chamber 31 which communicates with passage 29. The other end of passage 30 communicates with an annular groove 32 in body 16, which groove in turn communicates with outlet port 22.

A suction valve assembly 33 of any suitable construction is shown as arranged in chamber 25. A similar but discharge valve assembly 34 is shown as arranged in chamber 31.

An L-shaped passage 35 is shown as establishing communication between annular groove 32 and a chamber 36 including a clearance between the opposing end faces of outer valve body 16 and closure member 19.

During the suction or leftward stroke of plunger 13 by means not shown, fluid to be compressed is drawn into plunger end chamber 28 through connected ducts 21, 24, 23, 25 and 26 past now open suction valve assembly 33, while discharge valve assembly 34 remains closed. During the compression or rightward stroke of plunger 13, fluid in chamber 28 is pressurized and forced to flow through connected ducts 29, 31, 30 and 32 into discharge port 22 past now open discharge valve assembly 34, while suction valve assembly 33 remains closed.

Figure 2:
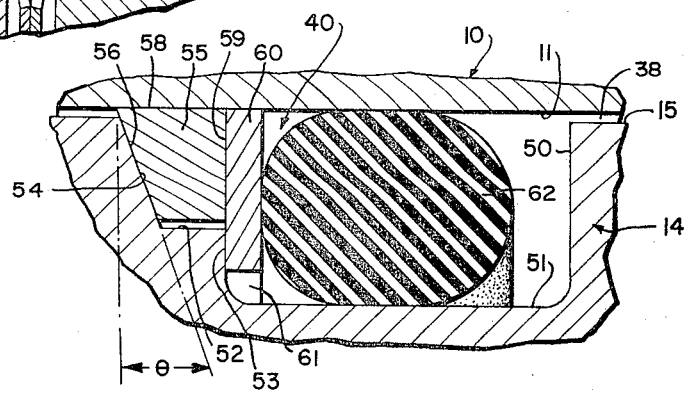
FIG. 2 is a greatly enlarged fragmentary cross-sectional view of one of the inventive seal assemblies shown in FIG. 1 and illustrating the condition of such assembly when little or no fluid pressure is applied thereto, this view being taken generally on line 2—2 of FIG. 1.

As previously stated discharge pressure may be as high as 100,000 p.s.i. Due to the need to move parts relative to one another during assembly there is bound to be a slight clearance between the valve body peripheries 15 and 18 and the bore 11. Thus, as illustrated in FIG. 2, an annular clearance 38 exists between opposing surfaces 11 and 15. A similar clearance exists between opposing surfaces 18 and 11.

It is desired to maintain the pressure of outlet fluid in port 22 in some portions of these annular clearances including clearance 38. For this purpose several annular seal assemblies are employed, each embodying the present invention. They are individually designated generally at 40, 41, 42, 43, 44 and 45. Seal assembly 40 is adjacent the inner or left end of inner valve body 14; seal assembly 41 is adjacent the outer or right end of this body 14; seal assembly 42 is adjacent the inner or left end of outer valve body 16 and arranged to the left of annular groove 32; seal assembly 43 is intermediate the annular grooves 32 and 24; seal assembly 44 is adjacent the outer or right end of body 16 and arranged to the right of groove 24; and seal assembly 45 is arranged on closure member 19.

Seal assemblies 40 and 41 confine pressurized fluid in clearance 38 therebetween; seal assemblies 42 and 43 confine pressurized fluid in the corresponding clearance between peripheries 11 and 18; and seal assemblies 44 and 45 confine the pressurized fluid in chamber 36.

The opposing end portions of valve bodies 14 and 16 are shown as provided with connected passages 48 and 49, respectively, whereby clearance 38 between seal assemblies 40 and 41 is placed in communication with that portion of corresponding clearance between peripheries 11 and 18 extending between seal assemblies 42 and 43.

Figure 3:
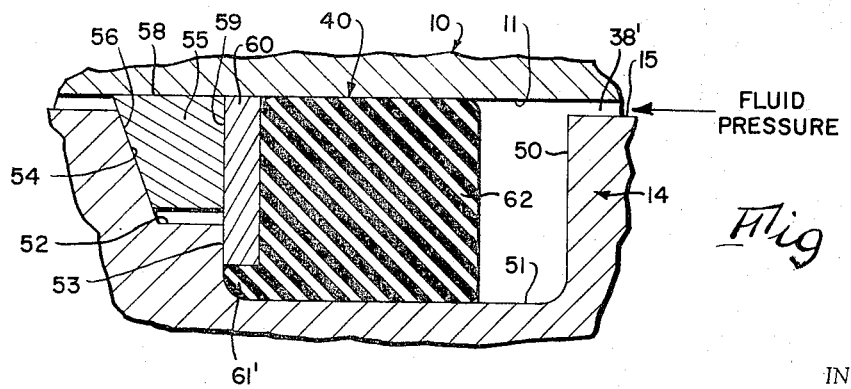
FIG. 3 is a view similar to FIG. 2 but illustrating the condition of the seal assembly when subjected to a fluid pressure of about 100,000 p.s.i.

Since seal assemblies 40–45 are alike except for a reversed orientation of assemblies 41, 43 and 45 with respect to assemblies 40, 42 and 44, it is deemed necessary to describe in detail only one seal assembly such as assembly 40 which is shown in enlarged cross-section in FIGS. 2 and 3.

Referring to FIG. 2 which illustrates seal assembly 40 in a substantially unloaded condition, valve body 14 is shown as provided with an annular groove 50 recessed from the peripheral surface 15 of this body and having a deep portion 51 and a shallow portion 52 forming therebetween an annular substantially radial shoulder 53. Shallow portion 52 is to the left of deep portion 51 as viewed in FIG. 2. In other words, shallow portion 52 is on the side of deep portion 51 opposite from the pressurizable clearance 38.

Shallow groove portion 52 has an end wall 54 which is flat and inclined laterally away from shoulder 53 in a direction outward with respect to the base of groove 50. Thus end wall 54 has an angle $\theta$ with respect to a transverse radial plane. This angle $\theta$ is critical and must fall in the range of from 18° to 22° for reasons hereinafter discussed.

A wedge ring 55 is arranged in shallow groove portion 52 and has a flat inclined surface 56 which engages groove end wall 54 and an outer cylindrical peripheral surface 58 which engages bore surface 11 of cylinder head 10. The opposite side surface 59 of wedge ring 55 is flat and lies in a transverse radial plane substantially coplanar with shoulder 53.

Arranged against shoulder 53 and wedge ring side 59 is a flat-sided back-up ring 60. This ring 60 has an outside diameter substantially the same as that of wedge ring 55 so that the outer cylindrical surfaces of both of these rings are substantially coterminous and engage bore surface 11. The inside diameter of back-up ring 60 is shown as less than the diameter of the base of the deep groove portion 51 so that a radial space exists as indicated at 61. Thus back-up ring 60 is arranged in the deep groove portion 51 and overlaps groove shoulder 53 and substantially covers the full area of wedge ring side surface 59.

Also arranged in deep groove portion 51 is an O-ring 62 of deformable elastomeric material such as rubber and dimensioned so as to engage bore surface 11 at all times and also preferably the base of deep groove portion 51 as shown. O-ring 62 also engages back-up ring 60 on the side.

Wedge ring 55 is split diagonally to a tangent at an angle of about 10° such as indicated at 63 in FIG. 1 so that it can change in dimension circumferentially and hence radially, the overlapping split ends sliding on one another to permit of this. It is essential that the wedge ring 55 be proportioned with a radial thickness approximately half the depth of radial width of the seal groove 51 for a reason explained later herein. Wedge ring 55 is preferably made of metal such as heat treated steel which is copper plated, or heat treated beryllium copper. The copper minimizes fretting of surfaces 54 and 56.

Back-up ring 60 may be made of any suitable ductile and antiscuff material such as tetrafluoroethylene or hard copper. This ring may be solid without a split or may be split so as to have a butt or spiral joint.

When no or substantially no pressure exists in clearance 38 as occurs during the suction stroke of plunger 13, the parts assume the condition depicted in FIG. 2 in which the peripheral surface 58 of wedge ring 55 engages bore surface 11 and the side surface 56 of this ring engages groove end wall surface 54, being held there by back-up ring 60 and O-ring 62, the latter engaging bore surface 11 and also the base of deep groove portion 51. It will be noted that clearance 38 is represented by a certain radial spacing of opposing surfaces 11 and 15.

During the compression stroke of plunger 13, the pressure in chamber 28 gradually increases up to, say, 100,000 p.s.i. at the end of this stroke, thereby placing all the connected passages including clearance 38 under this pressure which causes a radial increase in clearance 38 as represented at 38' in FIG. 3, and also causes the seal parts to assume the condition depicted in FIG. 3. Here it will be seen that O-ring 62 has been distorted under the pressure in clearance 38' and the unoccupied right hand portion of groove 50 into substantially rectangular form. This is due to axial compression effecting radial flow of the elastomeric material of which O-ring 62 is composed resulting in this O-ring being forced into engagement with bore surface 11, with the base of groove 50 even filling space 61 as indicated at 61', and with back-up ring 60. This back-up ring in turn is forced axially against shoulder 53 and by the displaced O-ring portion 61' into radial engagement with bore surface 11. This keeps the O-ring 62 from extruding into narrow crevices such as at the base of shallow groove portion 52 inside wedge ring 55 or between the outside peripheral surface of back-up ring 60 and bore surface 11.

Also, the axial force is transmitted by back-up ring 60 to radial surface 59 of wedge ring 55. This forces wedge ring inclined surface 56 against groove inclined wall surface 54 causing a camming action which tends to enlarge wedge ring 55 and force its outside peripheral surface 58 into sealing contact with bore surface 11.

When the plunger 13 starts again on a suction stroke, the pressure in clearance 38' (FIG. 3) may be relieved so that this clearance will decrease to that indicated at 38 (FIG. 2). Typically this change in clearance may be from .007 to .010 inch.

As previously indicated the angle $\theta$ is critical. If this angle is greater than 22°, so much axial movement of O-ring 62 occurs that it scuffs on bore surface 11 and tends to deteriorate rapidly under cyclic pressure changes. On the other hand, if angle $\theta$ is less than 18°, wedge ring 55 tends not to slide on groove end wall surface 54 and this ring becomes self-locking. Within the angle range of 18° to 22°, both of these undesirable tendencies have been found avoided.

As previously indicated, another critical aspect of the configuration of wedge ring 55 is that its radial thickness be approximately half the depth or radial width of the seal groove 51. By having the wedge ring so proportioned, when pressure is applied and the clearance space 38 increases causing the wedge ring to move outwardly of the groove, back-up ring 60 is anchored on shoulder 53 which prevents axial and radial movement of the seal ring 62 at location 61'. Conversely, it has been proven that if wedge ring 55 is widened radially to consume the full depth of groove 51, thus eliminating shoulder 53, the axial and radial movement of this wedge ring during full pressurization is imparted to the seal ring 62 causing it to move relative to the base of groove 51 and produce leakage.

From the foregoing, it will be seen that the present invention provides an annular seal assembly for sealing the joint between two members having opposing peripheral surfaces which is effective under high pressure and relaxes when this pressure is relieved, and is especially adapted to have a long and effective life under cyclic pressure changes which may cause relative movement between such surfaces in a direction perpendicular thereto. While the seal assembly is illustrated in an external groove provided in one member surrounded by another, the seal assembly may also be effectively utilized if arranged in an internal groove provided in the surrounding member. Accordingly, the scope of the present invention is to be measured by the appended claims.

What is claimed is:

1. An annular seal assembly for sealing the joint between two members having opposing peripheral surfaces comprising: means providing in one of said members an annular groove recessed from the peripheral surface of such member and having a deep portion and a shallow portion forming therebetween an annular substantially radial shoulder, the outer end wall of said shallow portion being inclined laterally away from said shoulder in a direction outward with respect to the base of said groove; a wedge ring arranged in said shallow portion and having a peripheral surface engaging the peripheral surface of the other of said members, and also having an inclined cam surface engaging said end wall; an annular ring of deformable elastomeric material arranged in said deep portion and engaging the base of the groove and the peripheral surface of said other of said members; and a backup ring also arranged in said deep portion between said wedge ring and annular ring and engaging said shoulder and the peripheral surface of the other of said members.

2. A seal assembly as set forth in claim 1 wherein said wedge ring is split.

3. A seal assembly as set forth in claim 1 wherein said end wall is inclined at an angle falling in the range of from 18° to 22° with respect to a transverse radial plane.

4. A seal assembly as set forth in claim 1 wherein said wedge ring has a radial thickness approximately half of the depth of said deep portion.

5. A seal assembly as set forth in claim 1 wherein said annular ring is an O-ring.

6. A seal assembly as set forth in claim 1 wherein said backup ring is spaced from the base of the deep portion of said groove.

7. A seal assembly as set forth in claim 1 wherein said backup ring is a solid ring of elastomeric material.

8. A seal assembly as set forth in claim 1 wherein said backup ring is a spiral joint ring of hard copper.

References Cited

UNITED STATES PATENTS

| | | | |
|---|---|---|---|
| 2,616,731 | 11/1952 | Osmon | 277—188 |
| 2,809,080 | 10/1957 | Mittell et al. | 277—177 X |
| 2,961,278 | 11/1960 | Newhall | 277—188 X |
| 3,059,939 | 10/1962 | Palasthy | 277—176 |

SAMUEL ROTHBERG, *Primary Examiner.*